(12) United States Patent
Feliss et al.

(10) Patent No.: US 6,580,585 B2
(45) Date of Patent: Jun. 17, 2003

(54) MAGNETIC DISK DRIVE WITH LOAD/UNLOAD STRUCTURE HAVING LUBRICANT RESERVOIR

(75) Inventors: Norbert A. Feliss, Sunnyvale, CA (US); Thomas A. Gregory, Campbell, CA (US); Sylvia L. Lee, San Jose, CA (US); Donald Ray Gillis, San Jose, CA (US); Vedantham Raman, Morgan Hill, CA (US)

(73) Assignee: Hitachi Global Storage Technologies, The Netherlands B.V., Amsterdam (NL)

( * ) Notice: Subject to any disclaimer, the term of this patent is extended or adjusted under 35 U.S.C. 154(b) by 117 days.

(21) Appl. No.: 09/880,233

(22) Filed: Jun. 12, 2001

(65) Prior Publication Data

US 2002/0186510 A1 Dec. 12, 2002

(51) Int. Cl.⁷ .......................... G11B 21/22; G11B 21/12
(52) U.S. Cl. .................................. 360/254.8; 360/97.02
(58) Field of Search .......................... 360/97.02, 97.03, 360/234.1, 254.8, 254.4, 255.3, 255.7

(56) References Cited

U.S. PATENT DOCUMENTS 6,122,143 A * 9/2000 Lemke et al. ............. 360/99.08
6,246,534 B1 * 6/2001 Gillis et al. ................... 360/75
2001/0033460 A1 * 10/2001 Fayeulle et al. ......... 360/254.8
2001/0045681 A1 * 11/2001 Fayeulle et al. ............ 264/107

FOREIGN PATENT DOCUMENTS

| JP | 10302421 A | * 11/1998 | ........... G11B/21/12 |
| JP | 11339412 A | * 12/1999 | ........... G11B/21/12 |
| JP | 2000030387 A | * 1/2000 | ........... G11B/21/21 |
| JP | 2001126418 A | * 5/2001 | ........... G11B/21/02 |

* cited by examiner

Primary Examiner—William Klimowicz
(74) Attorney, Agent, or Firm—Robert B. Martin

(57) ABSTRACT

The present invention is a magnetic disk drive for reading or writing magnetically, comprising: (i) a base plate; (ii) one or more of magnetic disks; (iii) a hub fixedly attached to the disks for supporting the disks; (iv) a motor operable to rotate the hub; (v) one or more of magnetic read/write heads, each associated with the surface of a disk; (vi) an actuator for supporting the heads and moving the heads across the disks; (vii) a support shaft attached to the base plate; and (viii) a load/unload structure for displacing the heads from the disk comprising an elongated body, a base portion fixedly attached to the base plate and a plurality of ramps extending outwardly from the body. The body of the structure is mounted through one or more holes in the body onto the support shaft so that the support shaft extends along the length of the body to support the structure.

8 Claims, 4 Drawing Sheets

MAGNETIC DISK DRIVE WITH LOAD/UNLOAD STRUCTURE HAVING LUBRICANT RESERVOIR

BACKGROUND OF THE INVENTION

1. Field of the Invention

The present invention relates generally to magnetic disk drives with load/unload structure and, more particularly, to a load/unload structure having a lubricant reservoir.

2. Description of the Background Art

A magnetic disk drive storage device typically comprises one or more thin film magnetic disks, each having at least one data recording surface including a plurality of concentric tracks of magnetically stored data, a spindle motor and spindle motor controller for supporting and rotating the disk(s) at a selected RPM, at least one read/write transducer or "head" per recording surface formed on a slider for reading information from and writing information to the recording surface, a data channel for processing the data read/written, a positionable actuator assembly for supporting the transducer in close proximity to a desired data track, and a servo system for controlling movement of the actuator assembly to position the transducer(s) over the desired track(s).

Each slider is attached on one surface to an actuator arm via a flexible suspension and includes on an opposite side an air bearing surface (ABS) of a desired configuration to provide favorable fly height characteristics. As the disk rotates, an air flow enters the slider's leading edge and flows in the direction of its trailing edge. The air flow generates a positive pressure on the ABS, lifting the slider above the recording surface. The slider is maintained at a nominal fly height over the recording surface by a cushion of air.

To avoid the problems associated with contact start/stop recording, some disk drive designs employ "load/unload" technology. According to this design, a ramp is provided for each slider/suspension assembly at the inner or outer diameter of the disk where the slider is "parked" securely while the spindle motor is powered down. During normal operation, the disk speed is allowed to reach a selected RPM (which may be below the normal operating RPM) before the head is "loaded" onto the disk from the ramp on the air cushion generated by the disk's rotation. In this manner, the slider flies over the disk without significant contact with the disk surface, eliminating contact start/stop wear. The load/unload ramp structure is generally made of plastic which can be injection molded into complex ramp structures.

With lower fly heights between the transducer head and the magnetic disk during operation of the disk drive, there is an increasing rate of intermittent contacts between the head and the disk resulting in damage to the disk surface. Although the disk is coated with lubricant during manufacture to protect it from such intermittent contact, during operation of the drive, the lubricant is depleted from the surface of the disk. Because of the problems associated with lubricant spin-off from the disk, a vapor phase lubricant reservoir system has been disclosed as a means for continuously maintaining a uniform lubricant film on the disk as described in U.S. Pat. No. 4,789,913 issued Dec. 6, 1988. The patent describes a method for lubricating the disk during operation of the drive. This method of lubrication continuously maintains the lubricant film on the disk drive during operation of the drive. Although this lubricant reservoir system will continuously lubricate the disk while the disk drive is operational, under the condition of prolonged shutdown a negligible amount of circulated airflow will occur and disk surface will not be sufficiently lubricated. Coupled with this inactivity is the possibility that the stored disk drive may experience a significant temperature gradient thereby causing a slow reduction in the thickness of the lubricant film on the disks. Although this stressed condition is readily corrected during operation of the disk drive, wear can occur during startup of the disk drive, especially during the critical phase of loading the heads onto the surfaces of the disks. During the initial loading, the heads in the head stack can come into intermittent contact with the disk until a lubricating thin-film bearing is established. Without adequate lubrication, the contact forces (between head and disk) may eventually cause debris evolution and pickup which eventually leads to head/disk failure. Therefore, there is a need in the art for a method of lubricating the head disk interface during shutdown of the disk drive.

It is the object of the present invention to provide a load/unload structure having lubricant reservoirs for lubricating the head surfaces during shutdown of the disk drive. Other objects and advantages will be apparent from the following disclosure.

SUMMARY OF THE INVENTION

The present invention relates to a magnetic disk drive for reading or writing magnetically, comprising: (i) a base plate; (ii) one or more of magnetic disks; (iii) a hub fixedly attached to the disks for supporting the disks; (iv) a motor attached to the base plate and operable to rotate the hub; (v) one or more magnetic read/write heads, each associated with the surface of a disk; (vi) one or more actuators for supporting the head(s) and moving the head(s) across the disk(s); and (vii) a load/unload structure comprising an elongated body, a base portion fixedly attached to the base plate and one or more ramps extending outwardly from the body. In one embodiment, each ramp is provided with a porous lubricant reservoir preferably positioned near the heads parked on the ramp. Lubricant having a high vapor pressure is disposed in the reservoir. During shutdown of the drive when the heads are parked on the ramps, the lubricant from the reservoirs will maintain a thin adsorbate film of lubricant on the head(s). The present invention minimizes the vapor-phase concentration gradient between reservoir unit and nearest head so as to maintain a well-controlled lubricant film on the surface of the head. In an alternative embodiment, the lubricant reservoir(s) are positioned on the body of the load/unload structure near the heads parked on the ramp.

A more thorough disclosure of the present invention is presented in the detailed description of the invention, which follows, and the accompanying figures.

DESCRIPTION OF THE PREFERRED EMBODIMENTS

Figure 1:
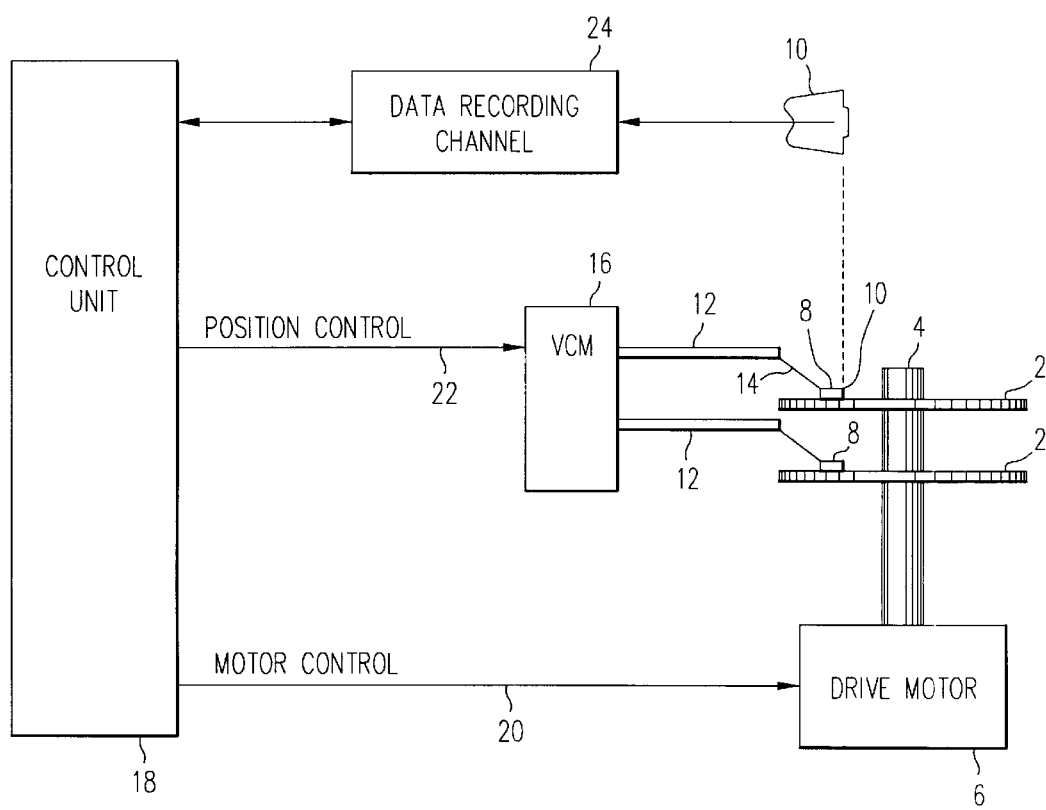
FIG. 1 is a schematic diagram of a magnetic disk storage system useful for the present invention.

Referring to FIG. 1, a magnetic disk storage system comprises at least a plurality of rotatable magnetic disks 2 supported on a spindle 4 and rotated by a disk drive motor 6 with a plurality of sliders 8 positioned adjacent the disks. Advanced thin film magnetic recording disks generally comprise a rigid substrate, a magnetic layer such as a cobalt-based metal alloy, a protective amorphous carbon layer and a lubricant layer, such as a perfluorpolyether disposed on the carbon overcoat. The sliders each support one or more magnetic read/write transducers 10, commonly referred to in the art as read/write heads.

The magnetic recording media on each disk is in the form of an annular pattern of concentric data tracks (not shown) on disk 2. As the disk rotates, the slider is moved radially or along an arcuate path over the disk surface so that the head 10 may access different portions of the disk where desired data is recorded.

Each slider 8 is attached on its upper surface to an actuator arm 12 by means of a suspension 14. The suspension provides a slight spring force which biases the slider towards the disk surface. Each actuator arm 12 is attached to a rotary actuator 16. The rotary actuator as shown in FIG. 1 may be a voice coil motor (VCM), for example.

The various components of the disk storage system are controlled in operation by control signals generated by control unit 18, such as access control signals and internal clock signals. Typically, the control unit 18 comprises logic control circuits, storage means and a microprocessor, for example. The control unit 18 generates control signals to control various system operations such as drive motor control signals on line 20 and head position and seek control signals on line 22. Read and write signals are communicated to and from read/write head by means of recording channel 24.

Figure 2:
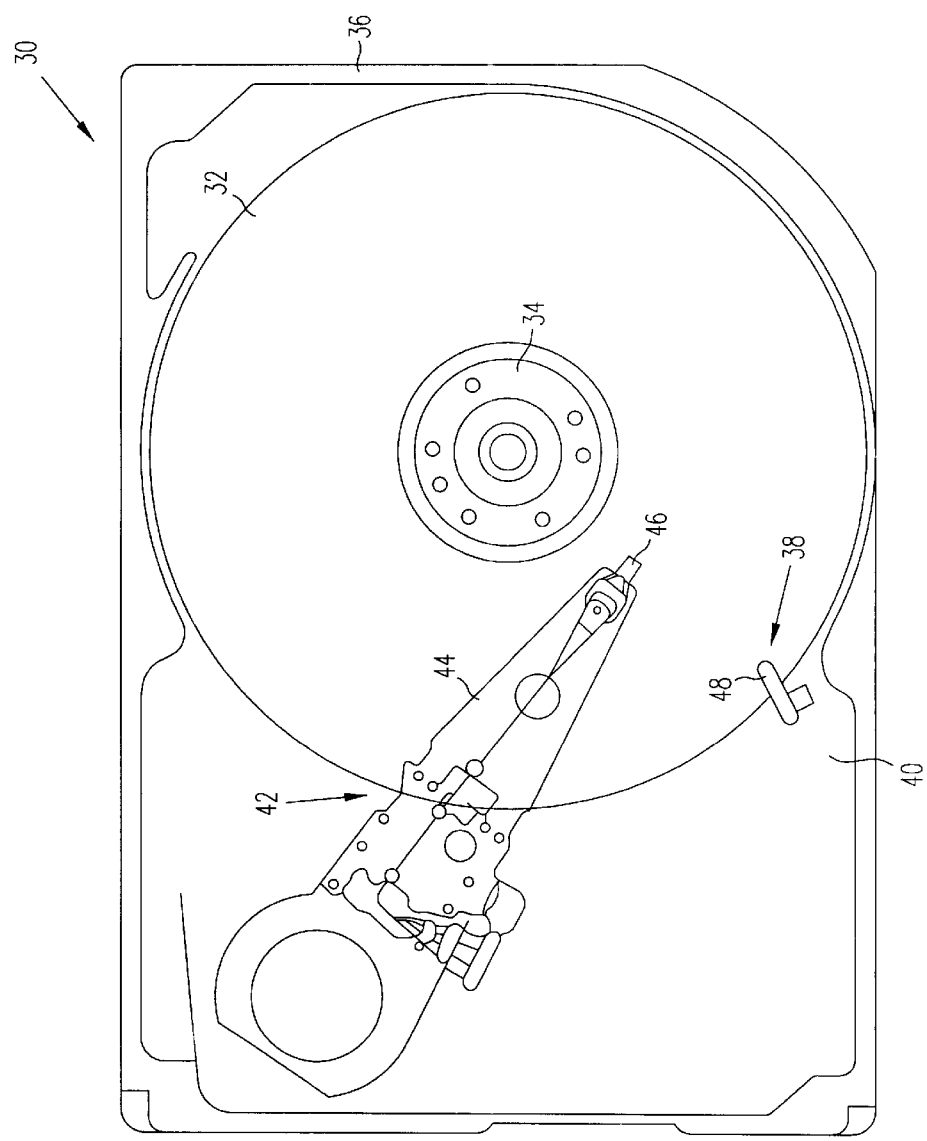
FIG. 2 is a top view of an embodiment of a magnetic storage system of the present invention.

Referring to FIG. 2, there is shown a disk drive 30 having a disk pack 32 comprising a plurality of stacked thin film magnetic recording disks attached to spindle or hub 34 enclosed in housing 36. Load/unload structure 38 is fixedly secured to the base plate 40 of the housing of the disk drive at the outer perimeter of disk pack 32. Rotary actuator assembly 42 comprises a plurality of actuator arms 44 each supporting a slider adjacent to a disk. Each actuator arm suitably has a protrusion or tab 46 at its distal end for engaging a ramp 48 of the load/unload structure 38 during load/unload operations.

Figure 3:
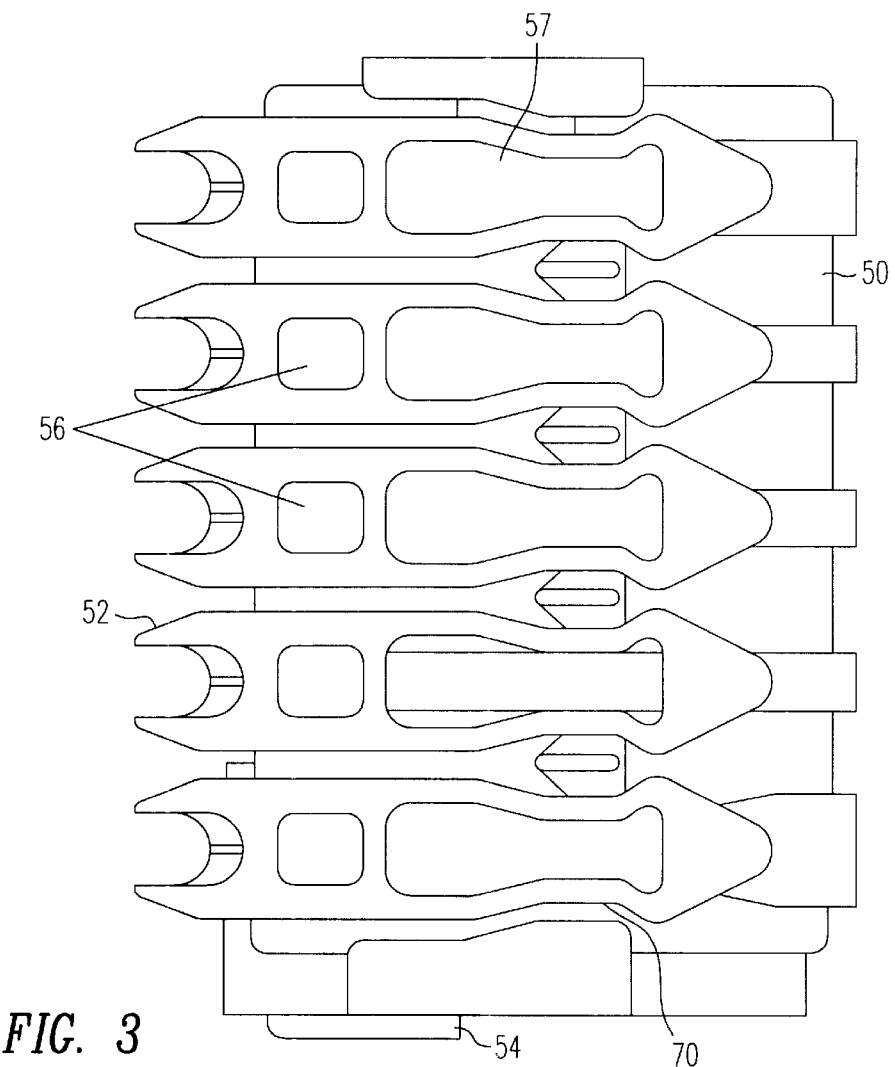
FIG. 3 is a side view of an embodiment of a load/unload structure of the present invention.

Referring to FIG. 3, in one embodiment, the load/unload structure of the present invention generally comprises an elongated body 50, a plurality of ramps 52 and a base portion 54. The base 54 may be provided with at least one hole preferably of polymer material, e.g., liquid crystalline polymer such as copolyesters of 4-hydroxybenzoic acid and 6-hydroxy-2-naphthoic acid (HAHN), polyacetals, or polyetheretherketone (PEEK). In this embodiment, each ramp 52 of the load/unload structure is provided with a lubricant reservoir 56 positioned on or in the ramp. Preferably, the reservoir is positioned on a side of the ramp which does not contact the actuator during load/unload. Preferably, the reservoir is positioned, as shown, on the side 57 of the ramp offset from the center of the ramp away from body 50. Preferably, the parked heads will be less than 1 mm from the reservoir. In an alternative embodiment, the reservoir may be positioned on the body of the load/unload structure which is generally orthogonal to the base plate when the load/unload structure is fixedly secured to the base plate. Suitably, the reservoir is a porous material having lubricant disposed in the pores. Suitable reservoir materials are porous materials with a large surface area including activated carbon, silica gel and porous glass, plastic, rubber, ceramic and metals. Suitable lubricants will have a vapor pressure at a temperature of 45° C. of greater than $7 \times 10^{-9}$ atmospheres. Suitable lubricants for use in the present invention include perfluoropolyethers such as z-Dol 1000, and z-Dol 2000. In an alternative embodiment, the reservoir may be filaments or granules of treated activated carbon containing lubricant and incorporated into the polymeric material used to construct the load/unload ramps. The load/unload ramps containing lubricant and incorporated into the polymeric material used to construct the load/unload ramps. The load/unload ramps are made of a polymer material cast in a mold. The critical function of the polymer in this application must allow for internal diffusion of lubricant and it must be non-contaminating regarding particulate and excessive outgassing. Other types of reservoir materials and lubricants suitable for use in the present inventions will be known to those skilled in the art.

Figure 4:
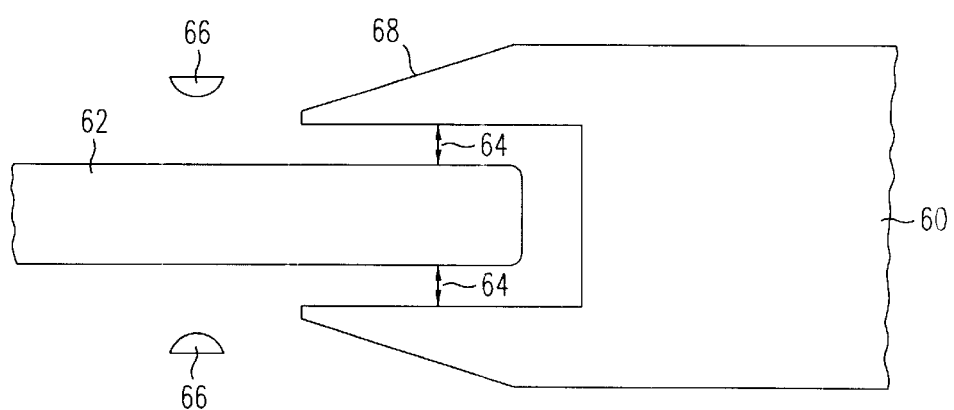
FIG. 4 is a side view of a ramp positioned adjacent a thin film disk.

Referring to FIG. 4, each ramp 60 is positioned adjacent a thin film disk 62. The vertical clearance 64 between the ramp structure and the rotating disk is generally very small (e.g., about 200 microns). To unload the head from the disk, the tab 66 of the actuator is moved onto the inclined contact surface 68 of ramp 60. The contact surface 68 of the ramp 60 will suitably be generally parallel to the base plate when the load/unload structure is fixedly attached to the base plate. The tab is moved along the contact surface to a park position on the ramp.

Figure 5:
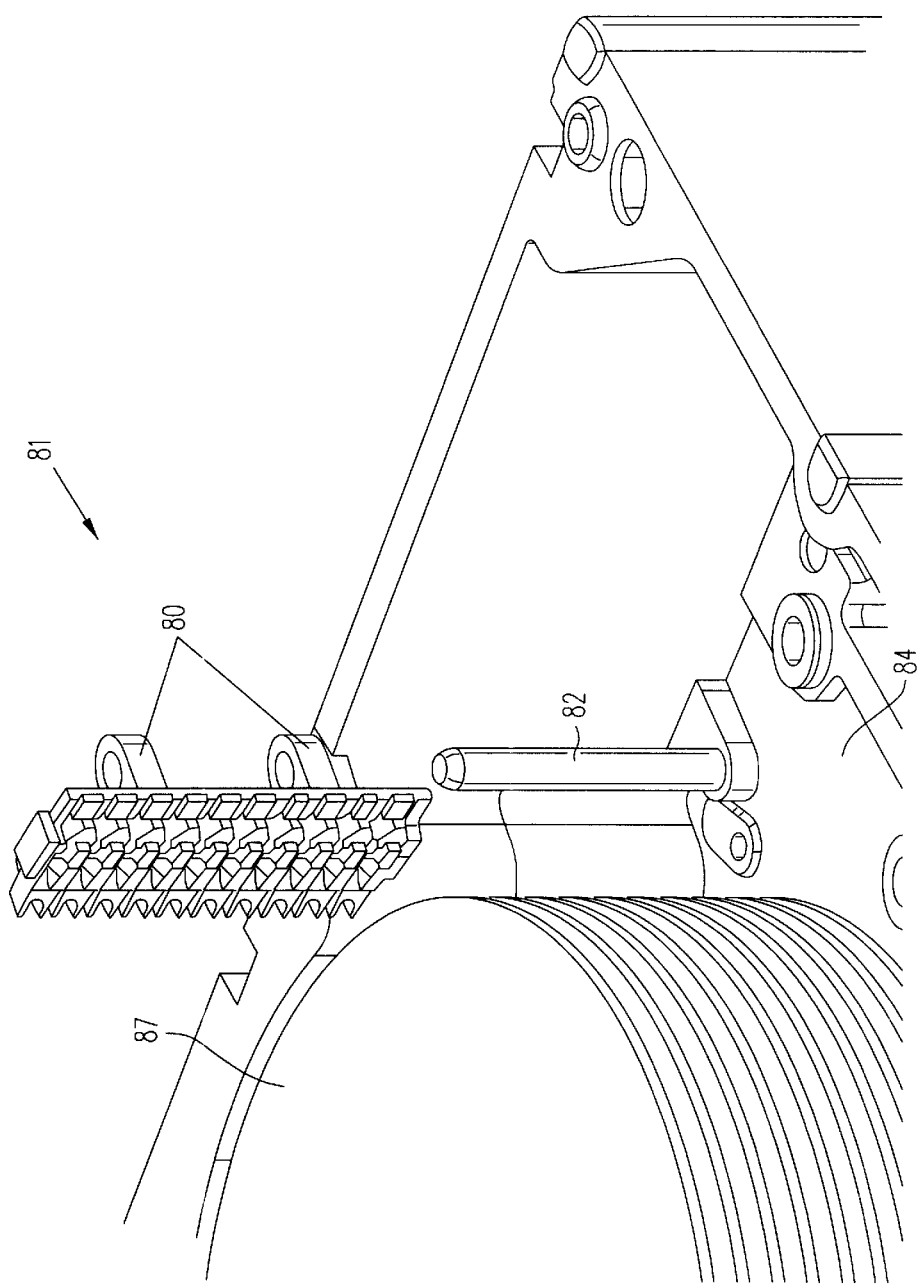
FIG. 5 is a perspective view of a load/unload structure of the present invention being mounted into a disk drive.

Referring to FIG. 5, the lugs 80 of another embodiment of a load/unload structure 81 of the present invention are mounted onto a support shaft 82 which is secured to base plate 84 of the disk drive adjacent disk pack 87.

The magnetic disk drive of the present invention provides improved performance of the disk drive after extended periods of shutdown of the drive.

Although the present invention has been described with respect to specific embodiments, the details thereof are not to be construed as limitations, for it will be apparent that various embodiments, changes and modifications may be resorted to without departing from the spirit and scope thereof; and it is understood that such equivalent embodiments are intended to be included within the scope of this invention.

The scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims.

We claim:

1. A magnetic recording device for reading and writing magnetically, comprising:

(i) a base plate;

(ii) magnetic disk comprising a substrate and a magnetic layer;

(iii) a hub fixedly attached to the disk for supporting the disk;

(iv) a motor attached to the base plate and operable to rotate the hub;

(v) a magnetic read/write head associated with a surface of the disk;

(vi) an actuator for supporting the head and moving the head across the disk; and (vii) a load/unload structure for contacting the actuator and displacing the head from the disk comprising a base portion fixedly attached to the base plate, an elongated body extending from the base portion and a ramp extending outwardly from the body, the structure having a porous lubricant reservoir containing lubricant having a vapor pressure of greater than $7 \times 10^{-9}$ atmospheres at 45° C.

2. The magnetic recording device of claim 1 wherein the reservoir is in the ramp.

3. The magnetic recording device of claim 2 wherein the reservoir is disposed on a side of the ramp which does not contact the actuator during load/unload.

4. The magnetic recording device of claim 3 wherein the reservoir comprises activated carbon.

5. The magnetic recording device of claim 3 wherein the lubricant is perfluoropolyether.

6. The magnetic recording device of claim 1 wherein the reservoir is in the elongated body.

7. The magnetic recording device of claim 6 wherein the reservoir comprises activated carbon.

8. The magnetic recording device of claim 6 wherein the lubricant is perfluoropolyether.

* * * * *